United States Patent
Li et al.

(10) Patent No.: US 9,882,655 B2
(45) Date of Patent: Jan. 30, 2018

(54) OPTICAL NETWORK-ON-CHIP, METHOD FOR DYNAMICALLY ADJUSTING OPTICAL LINK BANDWIDTH

(71) Applicant: Huawei Technologies Co., Ltd., Shenzhen (CN)

(72) Inventors: Yang Li, Hangzhou (CN); Qinye Huang, Hangzhou (CN); Xiaosong Cui, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/269,461

(22) Filed: Sep. 19, 2016

(65) Prior Publication Data

US 2017/0005735 A1    Jan. 5, 2017

Related U.S. Application Data

(63) Continuation of application No. PCT/CN2014/073792, filed on Mar. 20, 2014.

(51) Int. Cl.

| | |
|---|---|
| *H04J 14/00* | (2006.01) |
| *H04B 10/80* | (2013.01) |
| *H04Q 11/00* | (2006.01) |
| *H04B 10/50* | (2013.01) |
| *H04J 14/02* | (2006.01) |
| *H04L 29/06* | (2006.01) |

(Continued)

(52) U.S. Cl.
CPC ......... *H04B 10/801* (2013.01); *H04B 10/503* (2013.01); *H04J 14/0227* (2013.01);
(Continued)

(58) Field of Classification Search
CPC ..... H04B 10/801; H04B 10/503; H04L 69/14; H04J 14/0227; H04Q 11/0005;
(Continued)

(56) References Cited

U.S. PATENT DOCUMENTS

7,490,189 B2 * 2/2009 Eberle ................... H04L 49/109
361/734
7,634,195 B2 * 12/2009 Singh ..................... B82Y 20/00
398/43

(Continued)

FOREIGN PATENT DOCUMENTS

| CN | 102638311 A | 8/2012 |
|---|---|---|
| CN | 103428587 A | 12/2013 |

OTHER PUBLICATIONS

Zhang, L., et al., "Circuit-Switched On-Chip Photonic Interconnection Network," XP32456498, Aug. 29, 2012, pp. 282-284.

(Continued)

*Primary Examiner* — Juan A Torres
(74) *Attorney, Agent, or Firm* — Conley Rose, P.C.

(57) ABSTRACT

An optical network-on-chip and a method and an apparatus for dynamically adjusting optical link bandwidth is presented, wherein each fixedly interconnected optical transceiver in a cluster in the optical network-on-chip is configured to establish a link between the cluster and one cluster in other n-x clusters to exchange an optical signal; and a main controller is configured to allocate x adaptively interconnected transceivers to k fixed links with the heaviest communication traffic according to a set rule and communication traffic of fixed links established by n-x fixedly interconnected optical transceivers in the cluster; and for an adaptively interconnected optical transceiver in the x adaptively interconnected optical transceivers, control the adaptively interconnected optical transceiver to establish a link, except the fixed link, between two clusters connected by the fixed link.

11 Claims, 8 Drawing Sheets

(52) U.S. Cl.
CPC ......... *H04L 69/14* (2013.01); *H04Q 11/0005* (2013.01); *H04Q 2011/005* (2013.01); *H04Q 2011/009* (2013.01); *H04Q 2011/0016* (2013.01); *H04Q 2011/0018* (2013.01); *H04Q 2011/0086* (2013.01)

(58) Field of Classification Search
CPC ..... H04Q 2011/009; H04Q 2011/0018; H04Q 2011/0016; H04Q 2011/0086; H04Q 2011/005
USPC .......................................................... 398/49
See application file for complete search history.

(56) References Cited

U.S. PATENT DOCUMENTS

2010/0278532 A1 11/2010 Scandurra et al.
2012/0315052 A1 12/2012 Liu et al.
2013/0315526 A1 11/2013 Krishnamoorthy et al.

OTHER PUBLICATIONS

Gu, H., et al., "A Novel Optical Mesh Network-on-Chip for Gigascale Systems-on-Chip," XP31405346, Nov. 30, 2008, pp. 1728-1731.

Mo. K., et al., "A Hierarchical Hybrid Optical-Electronic Network-on-Chip," XP31753809, IEEE Annual Symposium on VLSI, Jul. 5, 2010, pp. 327-332.

Foreign Communication From a Counterpart Application, European Application No. 14886557.9, Extended European Search Report dated Feb. 6, 2017, 7 pages.

Foreign Communication From a Counterpart Application, PCT Application No. PCT/CN2014/073792, English Translation of International Search Report dated Dec. 24, 2014, 2 pages.

Foreign Communication From a Counterpart Application, PCT Application No. PCT/CN2014/073792, English Translation of Written Opinion dated Dec. 24, 2014, 7 pages.

* cited by examiner

OPTICAL NETWORK-ON-CHIP, METHOD FOR DYNAMICALLY ADJUSTING OPTICAL LINK BANDWIDTH

CROSS-REFERENCE TO RELATED APPLICATIONS

This application is a continuation of International Application No. PCT/CN2014/073792, filed on Mar. 20, 2014, the disclosure of which is hereby incorporated by reference in its entirety.

TECHNICAL FIELD

The present disclosure relates to the field of optical communications, and in particular, to an optical network-on-chip, a method for dynamically adjusting optical link bandwidth.

BACKGROUND

With continuous improvements of the semiconductor technologies, a system is developing in a multi-core direction. To meet a requirement of the system for high concurrency and a low latency of on-chip communication, a network-on-chip (NoC) gradually displaces a bus to become a mainstream interconnection scheme inside a chip. However, as a feature size of an integrated circuit technique continues to shrink, electrical interconnection and transmission faces great performance deteriorating in terms of latency and power consumption. Compared with a traditional electrical interconnection manner, optical interconnection has advantages, such as a low latency, a low loss, and anti-interference, and therefore, as a way of effectively resolving a potential problem of electrical interconnection, optical interconnection has attracted much attention in recent years. Optical interconnection is being introduced to the NoC, and becomes an on-chip structure of a high potentiality—an optical network-on-chip (ONoC).

Although with continuous improvements of the semiconductor integrated circuit processing technologies, a breakthrough has been made in manufacturing most optical devices, an optical caching technology compatible with a complementary metal-oxide-semiconductor (CMOS) technique is still not yet mature, which makes it difficult to temporarily store optical information in a transmission process. Therefore, electrical network configuration and optical network transmission are mostly used in a current ONoC.

Currently, there is an ONoC and a communication method that are based on wavelength allocation, where the ONoC uses a mesh topology structure, and uses a routing algorithm similar to X-Y. The ONoC includes multiple nodes, a structure of the ONoC is shown in FIG. 1A, and each circle in FIG. 1A indicates one node. A structure of each node is shown in FIG. 1B, and each circle in FIG. 1B includes one microring resonator (MRR).

A basic working principle of the NoC shown in FIG. 1A is as follows. In an optical information transmission process, each node completes X-Y turning using four MRRs shown in an origin in FIG. 1B, and turning wavelengths of each row and each column are different, which avoids interference, implements simultaneous transmission of optical information of multiple nodes in a same waveguide, and improves waveguide bandwidth utilization. When the optical information is being sent, two groups of MRRs (MRRs in the left direction of an x-axis and MRRs in the right direction of the x-axis) below modulate the information as optical information of a wavelength required for turning, and transmits the optical information to a waveguide in the direction of X. When the optical information arrives at an intermediate node that is in a same Y-axis as a destination node, four MRRs at an origin of the intermediate node turn the optical information to the direction of Y. When the optical information arrives at the destination node, vertical MRRs that are of the destination node and of corresponding wavelengths transmit the optical information to an optical-to-electrical converter for completing optical-to-electrical conversion, and information obtained after optical-to-electrical conversion is sent to a processing unit, where IP in FIG. 1B is a processor or a memory.

The foregoing ONoC uses a routing algorithm similar to X-Y, and only one path exists between a source node and a destination node. Adaptive adjustment cannot be performed on a transmission path according to a network status, and network congestion is likely to occur when load is imbalanced.

SUMMARY

Embodiments of the present disclosure provide an ONoC and a method and an apparatus for dynamically adjusting optical link bandwidth, which are used to resolve a problem in the prior art that because adaptive adjustment cannot be performed on a transmission path according to a network status, network congestion is likely to occur when load is imbalanced.

According to a first aspect, an ONoC is provided, including an optical router and n-x+1 clusters, where each cluster includes at least one node, at least one electrical router, n optical transceivers, and one main controller, where both n and x are positive integers, x is less than n, the node is configured to store or process an electrical signal, and the optical router is configured to route optical signals between different clusters; in a cluster, each electrical router is connected to at least one node, and each electrical router is separately connected to n optical transceivers, where each optical transceiver is configured to convert an electrical signal received from the electrical router into an optical signal and send the optical signal to the optical router, and convert an optical signal received from the optical router into an electrical signal and send the electrical signal to the electrical router; n optical transceivers in a cluster include n-x fixedly interconnected optical transceivers and x adaptively interconnected optical transceivers, where each fixedly interconnected optical transceiver is configured to establish, using the optical router, a link between the cluster and one cluster in other n-x clusters except the cluster, to exchange an optical signal, and a different fixedly interconnected optical transceiver is configured to establish a link between the cluster and a different cluster in the other n-x clusters; and a main controller in a cluster is configured to allocate x adaptively interconnected transceivers to k fixed links with the heaviest communication traffic according to a set rule and communication traffic of fixed links established by n-x fixedly interconnected optical transceivers in the cluster; and for an adaptively interconnected optical transceiver in the x adaptively interconnected optical transceivers, control the adaptively interconnected optical transceiver to establish a link, except the fixed link, between two clusters connected by the fixed link, where no interference occurs between optical signals transmitted on different links, k is a positive integer, k is less than n-x, and communication traffic of a fixed link is an information amount received by a fixedly interconnected optical transceiver that establishes the fixed link and carried by an electrical signal from an electrical router in a cluster in which the fixedly interconnected optical transceiver is located.

With reference to the first aspect, in a first possible implementation manner, electrical routers in a cluster are connected by means of an electrical interconnection line and using a network topology selected according to a network size of the cluster; and each electrical router in the cluster is configured to determine that a destination node of the received electrical signal is in the cluster in which the electrical router is located after receiving an electrical signal generated by a node connected to the electrical router, and route the received electrical signal to the destination node according to a routing algorithm used in the cluster in which the electrical router is located.

With reference to the first aspect, in a second possible implementation manner, the optical transceiver includes an optical transmitter and an optical receiver, where the optical transmitter is configured to allocate one time stamp to each electrical router connected to the optical transceiver; convert, in a time stamp allocated to an electrical router, an electrical signal received from the electrical router into an optical signal; and send the optical signal to the optical router, where the electrical signal received from the electrical router is an electrical signal that is generated by a node connected to the electrical router and that is received by a node in another cluster except a cluster in which the electrical router is located; and the optical receiver is configured to receive an optical signal from the optical router, where a wavelength of the optical signal is corresponding to a cluster in which the optical transceiver is located; convert the received optical signal into an electrical signal, and send the electrical signal to each electrical router connected to the optical transceiver, so that an electrical router connected to a destination node that needs to receive the electrical signal sends the electrical signal to the destination node, and another electrical router connected to the optical transceiver discards the electrical signal.

With reference to the second possible implementation manner of the first aspect, in a third possible implementation manner, the optical transceiver is a fixedly interconnected optical transceiver, and the optical transmitter in the optical transceiver includes a laser with a fixed frequency and a first modulator, where the laser with a fixed frequency is configured to generate light of a preset wavelength for optical signal routing between two clusters connected by the optical transceiver, where lasers with a fixed frequency in different fixedly interconnected optical transceivers generate light of different wavelengths; and the first modulator is configured to, in a time stamp allocated to an electrical router connected to the optical transceiver, modulate information carried in an electrical signal received from the electrical router onto the light generated by the laser with a fixed frequency, and send light onto which the information is modulated to the optical router.

With reference to the third possible implementation manner of the first aspect, in a fourth possible implementation manner, the optical transceiver is a fixedly interconnected optical transceiver, and the optical transmitter in the optical transceiver further includes a local counter, where the local counter is connected to the first modulator in the cluster; the local counter is configured to collect statistics about communication traffic that is in preset duration and of a link established by the fixedly interconnected optical transceiver in which the first modulator connected to the local counter is located; and a main controller in the cluster in which the optical transceiver is located is configured to determine k fixed links with the heaviest communication traffic in the preset duration according to communication traffic, collected by n-x local counters in the cluster, that is in the preset duration and of fixed links established by fixedly interconnected optical transceivers in the cluster; allocate x adaptively interconnected transceivers in the cluster to the k fixed links with the heaviest communication traffic according to a set rule; and control the adaptively interconnected optical transceiver to establish, using the optical router, a link, except the fixed link, between two clusters connected by the fixed link.

With reference to the second possible implementation manner of the first aspect, in a fifth possible implementation manner, the optical transceiver is an adaptively interconnected optical transceiver, and the optical transmitter in the optical transceiver includes a tunable laser and a second modulator, where the tunable laser is configured to generate light of which a wavelength is determined by a main controller according to the optical transceiver and two clusters connected by the optical transceiver, where the light is used for optical signal routing between the two clusters connected by the optical transceiver, and the main controller is in the cluster in which the optical transceiver is located, where when an adaptively interconnected optical transceiver connects two different clusters, wavelengths of light generated by a tunable laser in the adaptively interconnected optical transceiver are different; when different adaptively interconnected optical transceivers connect two same clusters, wavelengths of light generated by tunable lasers in the different adaptively interconnected optical transceivers are different from each other; when two clusters connected by an adaptively interconnected optical transceiver are the same as two clusters connected by a fixedly interconnected optical transceiver, a wavelength of light generated by a tunable laser in the adaptively interconnected optical transceiver is different from a wavelength of light generated by a laser with a fixed frequency in the fixedly interconnected optical transceiver; and the second modulator is configured to, in a time stamp allocated to an electrical router connected to the optical transceiver, modulate information carried in an electrical signal received from the electrical router onto the light generated by the tunable laser, and send light onto which the information is modulated to the optical router.

With reference to the second possible implementation manner of the first aspect, in a sixth possible implementation manner, the optical receiver in the optical transceiver includes a detector, where the detector is configured to receive an optical signal from the optical router, convert the received optical signal into an electrical signal, and send the electrical signal to electrical routers connected to the detector, where the electrical routers connected to the detector are electrical routers in the cluster in which the optical transceiver that includes the detector is located.

With reference to the first aspect, in a seventh possible implementation manner, the optical router includes a wavelength division multiplexer, a wavelength division demultiplexer, and an optical switch, where the wavelength division multiplexer is configured to combine optical signals that are of different wavelengths and sent by optical transceivers in the ONoC into one beam and send the beam to the optical switch; the wavelength division demultiplexer is configured to decompose, according to wavelengths, optical signals that are of different wavelengths and received from the optical switch, and for a cluster in the network-on-chip, send an optical signal of a wavelength corresponding to the cluster to optical transceivers in the cluster; and the optical switch is configured to complete wavelength-based optical signal routing, and route optical signals between two different clusters using at least x+1 different wavelengths.

According to a second aspect, a method for dynamically adjusting link bandwidth is provided, including determining communication traffic of fixed links established by n-x fixedly interconnected optical transceivers in a cluster, where each fixedly interconnected optical transceiver in the cluster establishes, using an optical router, a fixed link between the cluster and one cluster in other n-x clusters except the cluster, to exchange an optical signal, and a different fixedly interconnected optical transceiver in the cluster is configured to establish a fixed link between the cluster and a different cluster in the other n-x clusters; allocating x adaptively interconnected optical transceivers in the cluster to k fixed links with the heaviest communication traffic according to a set rule; and controlling the adaptively interconnected optical transceiver to establish, using the optical router, a link, except the fixed link, between two clusters connected by the fixed link, where no interference occurs between optical signals transmitted on different links, k is a positive integer, k is less than n-x, and communication traffic of a fixed link is an information amount received by a fixedly interconnected optical transceiver that establishes the fixed link and carried by an electrical signal from an electrical router in a cluster in which the fixedly interconnected optical transceiver is located.

With reference to the second aspect, in a first possible implementation manner, the determining communication traffic of fixed links established by n-x fixedly interconnected optical transceivers in a cluster includes receiving communication traffic, collected by local counters in n-x local counters in a cluster, that is in preset duration and of fixed links established by fixedly interconnected optical transceivers connected to the local counters; and determining, according to the communication traffic that is in the preset duration and collected by the n-x local counters in the cluster, communication traffic that is in the preset duration and of fixed links established by fixedly interconnected optical transceivers in the cluster.

With reference to the second aspect, in a second possible implementation manner, the controlling the adaptively interconnected optical transceiver to establish, using the optical router, a link, except the fixed link, between two clusters connected by the fixed link includes, for an adaptively interconnected optical transceiver in the x adaptively interconnected optical transceivers, determining, according to the adaptively interconnected optical transceiver and two clusters connected by the fixed link, a wavelength of light generated by a tunable laser in the adaptively interconnected optical transceiver after the adaptively interconnected optical transceiver is allocated to a fixed link in the k fixed links with the heaviest communication traffic, so that the tunable laser in the adaptively interconnected optical transceiver generates light according to the determined wavelength, where when an adaptively interconnected optical transceiver connects two different clusters, wavelengths of light generated by a tunable laser in the adaptively interconnected optical transceiver are different; when different adaptively interconnected optical transceivers connect two same clusters, wavelengths of light generated by tunable lasers in the different adaptively interconnected optical transceivers are different from each other; when two clusters connected by an adaptively interconnected optical transceiver are the same as two clusters connected by a fixedly interconnected optical transceiver, a wavelength of light generated by a tunable laser in the adaptively interconnected optical transceiver is different from a wavelength of light generated by a laser with a fixed frequency in the fixedly interconnected optical transceiver.

According to a third aspect, an apparatus for dynamically adjusting link bandwidth is provided, including a determining module configured to determine communication traffic of fixed links established by n-x fixedly interconnected optical transceivers in a cluster, where each fixedly interconnected optical transceiver in the cluster establishes, using an optical router, a fixed link between the cluster and one cluster in other n-x clusters except the cluster, to exchange an optical signal, and a different fixedly interconnected optical transceiver in the cluster is configured to establish a fixed link between the cluster and a different cluster in the other n-x clusters; an allocation module configured to allocate x adaptively interconnected optical transceivers in the cluster to k fixed links with the heaviest communication traffic according to a set rule; and a control module configured to control the adaptively interconnected optical transceiver to establish, using the optical router, a link, except the fixed link, between two clusters connected by the fixed link, where no interference occurs between optical signals transmitted on different links, k is a positive integer, k is less than n-x, and communication traffic of a fixed link is an information amount received by a fixedly interconnected optical transceiver that establishes the fixed link and carried by an electrical signal from an electrical router in a cluster in which the fixedly interconnected optical transceiver is located.

With reference to the third aspect, in a first possible implementation manner, the determining module is configured to receive communication traffic, collected by local counters in n-x local counters in a cluster, that is in preset duration and of fixed links established by fixedly interconnected optical transceivers connected to the local counters; and determine, according to the communication traffic that is in the preset duration and collected by the n-x local counters in the cluster, communication traffic that is in the preset duration and of fixed links established by fixedly interconnected optical transceivers in the cluster.

With reference to the third aspect, in a second possible implementation manner, the control module is configured to, for an adaptively interconnected optical transceiver in the x adaptively interconnected optical transceivers determine, according to the adaptively interconnected optical transceiver and two clusters connected by the fixed link, a wavelength of light generated by a tunable laser in the adaptively interconnected optical transceiver after the adaptively interconnected optical transceiver is allocated to a fixed link in the k fixed links with the heaviest communication traffic, so that the tunable laser in the adaptively interconnected optical transceiver generates light according to the determined wavelength, where when an adaptively interconnected optical transceiver connects two different clusters, wavelengths of light generated by a tunable laser in the adaptively interconnected optical transceiver are different; when different adaptively interconnected optical transceivers connect two same clusters, wavelengths of light generated by tunable lasers in the different adaptively interconnected optical transceivers are different from each other; when two clusters connected by an adaptively interconnected optical transceiver are the same as two clusters connected by a fixedly interconnected optical transceiver, a wavelength of light generated by a tunable laser in the adaptively interconnected optical transceiver is different from a wavelength of light generated by a laser with a fixed frequency in the fixedly interconnected optical transceiver.

According to the ONoC and the method and the apparatus for dynamically adjusting optical link bandwidth that are provided in the embodiments of the present disclosure, a main controller in each cluster in the ONoC can allocate x adaptively interconnected transceivers in the cluster to k fixed links with the heaviest communication traffic according to a set rule and communication traffic of fixed links established by n-x fixedly interconnected optical transceivers in the cluster; and for an adaptively interconnected optical transceiver in the x adaptively interconnected optical transceivers, control the adaptively interconnected optical transceiver to establish a link, except the fixed link, between two clusters connected by the fixed link after the adaptively interconnected optical transceiver is allocated to a fixed link in the k fixed links with the heaviest communication traffic. No interference occurs between optical signals transmitted on different links, and therefore, according to the ONoC provided in the embodiments of the present disclosure, bandwidth of links between clusters connected by some fixed links in the k fixed links with the heaviest communication traffic can be increased, and a probability of network congestion is reduced.

DESCRIPTION OF EMBODIMENTS

Embodiments of the present disclosure provide an ONoC and a method and an apparatus for dynamically adjusting optical link bandwidth. A main controller in each cluster in the ONoC allocates x adaptively interconnected transceivers in the cluster to k fixed links with the heaviest communication traffic according to a set rule and communication traffic of fixed links established by n-x fixedly interconnected optical transceivers in the cluster; and controls the adaptively interconnected optical transceiver to establish a link, except the fixed link, between two clusters connected by the fixed link. No interference occurs between optical signals transmitted on different links, and therefore, bandwidth of links between clusters connected by some fixed links in the k fixed links with the heaviest communication traffic is increased, and a probability of network congestion is reduced.

With reference to accompanying drawings, the following describes specific implementation manners of the ONoC and the method and the apparatus for dynamically adjusting optical link bandwidth that are provided in the embodiments of the present disclosure.

Figure 1A:
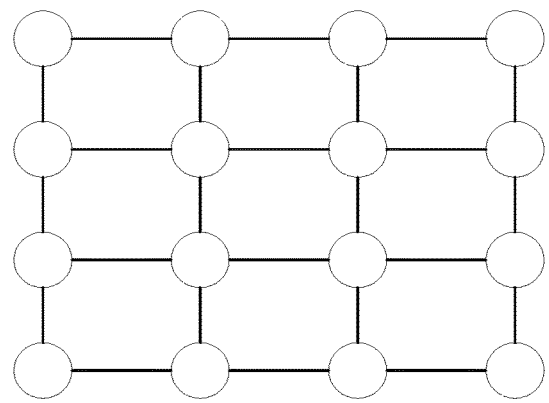
FIG. 1A and FIG. 1B are each a schematic structural diagram of an ONoC in the prior art.
Figure 1B:
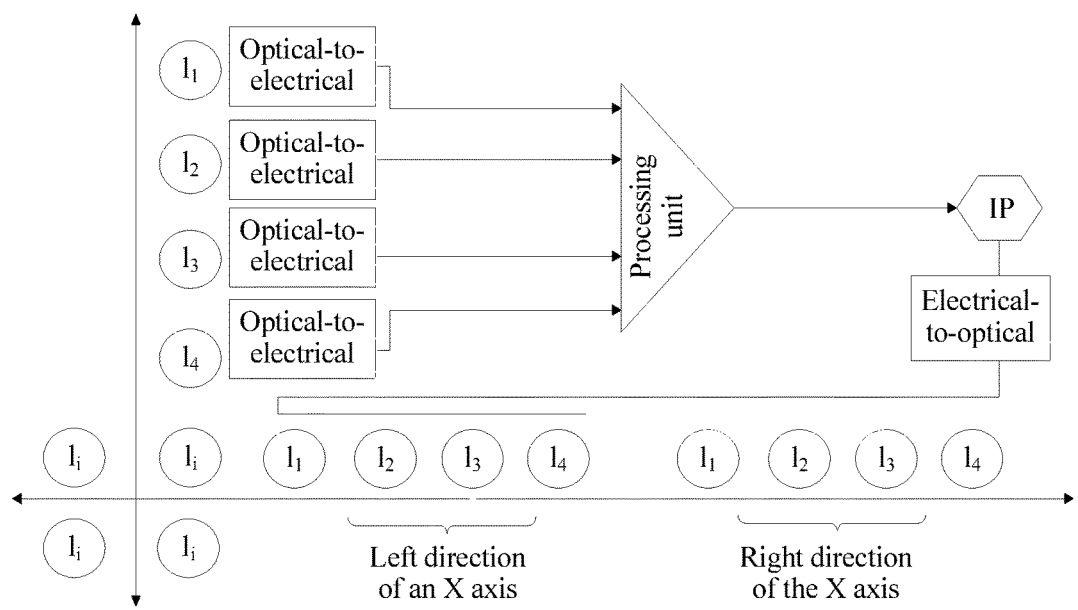
Figure 2A:
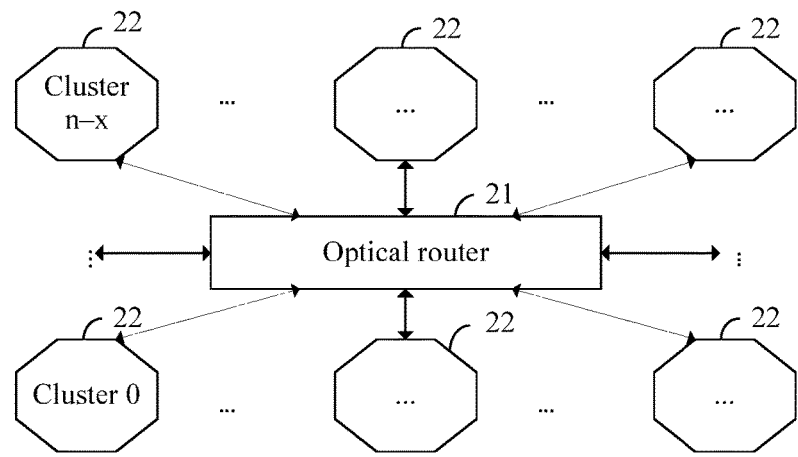
FIG. 2A, FIG. 2B, and FIG. 2C are each a schematic structural diagram of an ONoC according to an embodiment of the present disclosure.
Figure 2B:
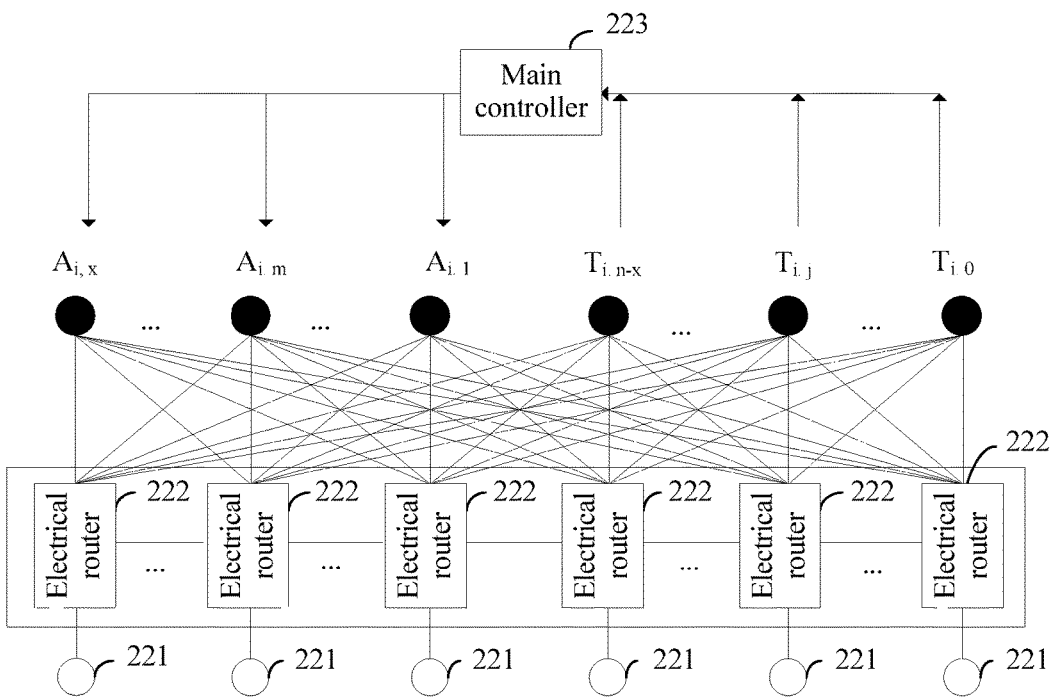

As shown in FIG. 2A, an ONoC provided in an embodiment of the present disclosure includes an optical router 21 and n-x+1 clusters 22, where an $i^{th}$ cluster 22 (as shown in FIG. 2B, i=0, ... n-x) includes at least one node 221, at least one electrical router 222 (in FIG. 2B, that a cluster includes n nodes 221 and n electrical routers 222 is used as an example for description), n optical transceivers (in FIG. 2B, $T_{i,j}$, j=0, ... n-x; j≠i; and $A_{i,m}$, m=1, ... x), and a main controller 223, where both n and x are positive integers, x is less than n, each node 221 is configured to store or process an electrical signal, and the optical router 21 is configured to route optical signals between different clusters.

In a cluster, each electrical router is connected to at least one node, and each electrical router is separately connected to n optical transceivers, where each optical transceiver is configured to convert an electrical signal received from the electrical router into an optical signal and send the optical signal to the optical router 21, and convert an optical signal received from the optical router 21 into an electrical signal and send the electrical signal to the electrical router. In FIG. 2B, each electrical router is connected to only one node, and certainly, each electrical router may be connected to multiple nodes.

n optical transceivers in a cluster include n-x fixedly interconnected optical transceivers and x adaptively interconnected optical transceivers, where each fixedly interconnected optical transceiver is configured to establish, using the optical router, a link between the cluster and one cluster in other n-x clusters except the cluster, to exchange an optical signal, and a different fixedly interconnected optical transceiver is configured to establish a link between the cluster and a different cluster in the other n-x clusters, where in FIG. 2B, $T_{i,j}$ indicates a fixedly interconnected optical transceiver that is in the $i^{th}$ cluster and that establishes a link between the $i^{th}$ cluster and a $j^{th}$ cluster to perform optical interaction, and $A_{i,m}$ indicates an $m^{th}$ adaptively interconnected optical transceiver in the $i^{th}$ cluster.

A main controller 223 in a cluster is configured to allocate x adaptively interconnected transceivers, that is, $A_{i,m}$, to k fixed links with the heaviest communication traffic according to a set rule and communication traffic of fixed links established by n-x fixedly interconnected optical transceivers in the cluster, that is, $T_{i,j}$; and for an adaptively interconnected optical transceiver in the x adaptively interconnected optical transceivers, control the adaptively interconnected optical transceiver to establish a link, except the link, between two clusters connected by the fixed link after the adaptively interconnected optical transceiver is allocated to a fixed link in the k fixed links with the heaviest communication traffic, where k is a positive integer, and k is less than n-x. When a cluster includes n electrical routers, each electrical router in the n electrical routers is connected to n optical transceivers in the cluster, that is, the electrical routers in the cluster and the optical transceivers in the cluster are fully interconnected, where communication traffic of a fixed link is an information amount received by a fixedly interconnected optical transceiver that establishes the fixed link and carried by an electrical signal from an electrical router in a cluster in which the fixedly interconnected optical transceiver is located.

No interference occurs between optical signals transmitted on different links, and the different links may be different links connected to two same clusters, or may be different links connected to different clusters. The different links connected to two clusters include a fixed link established by a fixedly interconnected optical transceiver, and if a fixed link established by a fixedly interconnected optical transceiver is a fixed link in k fixed links with the heaviest communication traffic in a cluster in which the fixedly interconnected optical transceiver is located, the foregoing different links connected to two clusters further include a link established by an adaptively interconnected optical transceiver.

Allocating the x adaptively interconnected transceivers, that is, $A_{i,\ m}$, to the k fixed links with the heaviest communication traffic according to the set rule may be for example, when k=2, allocating more than half adaptively interconnected transceivers in the x adaptively interconnected transceivers to a fixed link with the heaviest communication traffic, and allocating remaining adaptively interconnected transceivers in the x adaptively interconnected transceivers to a fixed link with the second heaviest communication traffic; or may be allocating all the x adaptively interconnected transceivers to a fixed link with the heaviest communication traffic.

For example, the ONoC includes three clusters, and each cluster includes four optical transceivers, two of which are fixedly interconnected optical transceivers, and two of which are adaptively interconnected optical transceivers. Each optical transceiver includes one optical receiver, and therefore, each cluster includes four optical receivers. It is assumed that communication traffic in a communication process between the first cluster and the third cluster is greater than communication traffic in a communication process between the first cluster and the second cluster, and if k=1 for k fixed links with the heaviest communication traffic in the first cluster, two adaptively interconnected optical transceivers in the first cluster are connected to both the first cluster and the third cluster; if k=2 for k fixed links with the heaviest communication traffic in the first cluster, the case may be that two adaptively interconnected optical transceivers in the first cluster are connected to both the first cluster and the third cluster, or may be that one adaptively interconnected optical transceiver in the first cluster is connected to the first cluster and the third cluster, and the other adaptively interconnected optical transceiver in the first cluster is connected to the first cluster and the second cluster. One fixedly interconnected optical transceiver in the first cluster is connected to the first cluster and the second cluster, and the other fixedly interconnected optical transceiver in the first cluster is connected to the first cluster and the third cluster.

Therefore, how to allocate adaptively interconnected optical transceivers in a cluster depends on a preset rule and a value of k in k fixed links with the heaviest communication traffic in the cluster.

In addition, in FIG. 2B, electrical routers in the $i^{th}$ cluster are sequentially connected. Actually, another connection manner may also be used, for example, a connection manner in FIG. 2C.

Figure 2C:
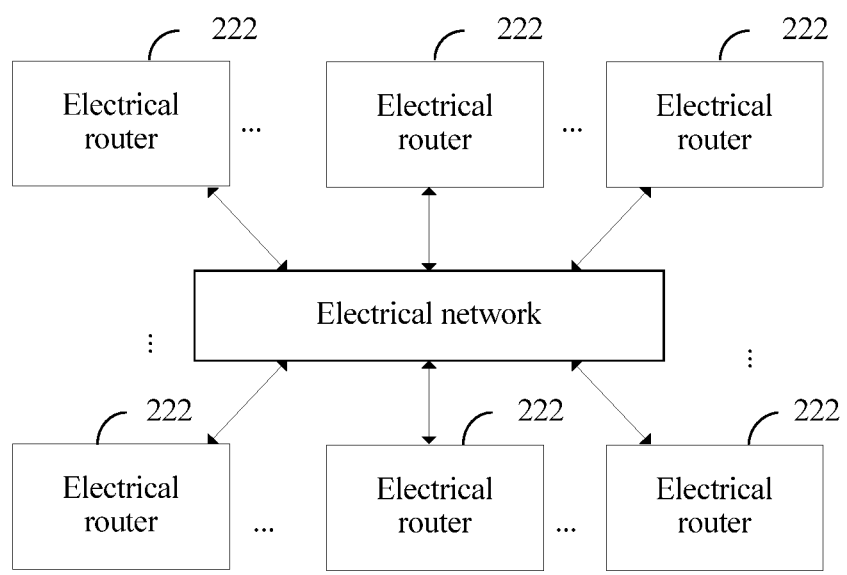

As shown in FIG. 2C, electrical routers 222 in a cluster are connected by means of an electrical interconnection line and using a network topology selected according to a network size of the cluster, for example, a quantity of electrical routers in the cluster.

Each electrical router 222 in the cluster is configured to, after receiving an electrical signal generated by a node connected to the electrical router, determine that a destination node of the received electrical signal is in the cluster in which the electrical router is located, and route the received electrical signal to the destination node according to a routing algorithm used in the cluster in which the electrical router is located. A routing algorithm used in a cluster in which an electrical router is located is decided by a network topology of the cluster in which the electrical router is located. An electrical network in FIG. 2C includes an electrical interconnection line that connects each electrical router, and a routing algorithm.

When one electrical router is connected to multiple nodes, different nodes may be connected to different ports of the electrical router, and then which node is to be connected to an output port of the electrical router is decided by means of arbitration.

Figure 3:
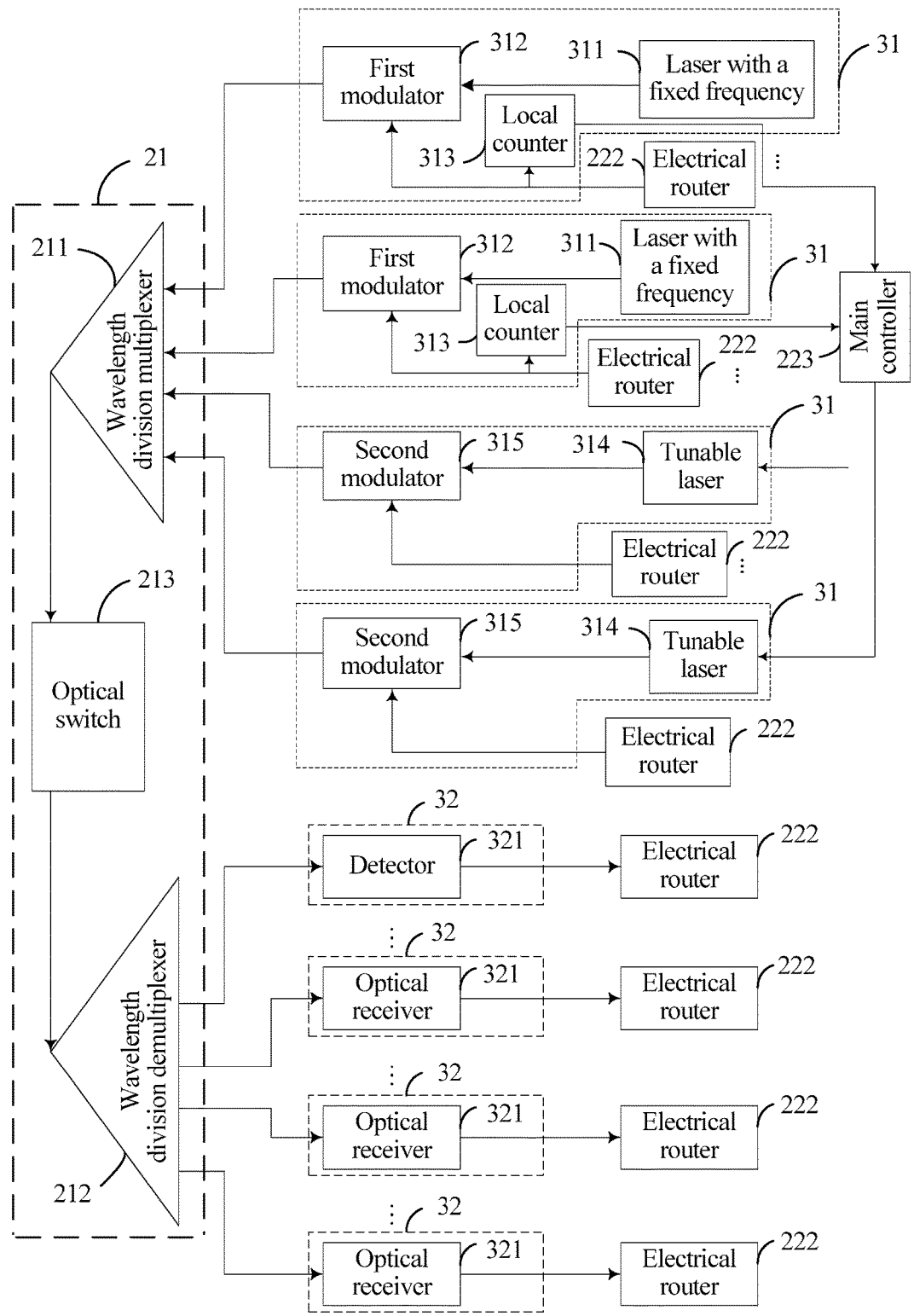
FIG. 3 is a schematic structural diagram of an optical transceiver and an optical router according to an embodiment of the present disclosure.

Optionally, as shown in FIG. 3, an optical transceiver includes an optical transmitter 31 and an optical receiver 32, where the optical transmitter 31 is configured to allocate one time stamp to each electrical router 222 connected to the optical transceiver (one electrical router 222 in FIG. 3 indicates all electrical routers in a cluster in which the optical transceiver is located); convert, in a time stamp allocated to an electrical router, an electrical signal received from the electrical router into an optical signal; and send the optical signal to an optical router, where the electrical signal received from the electrical router is an electrical signal that is generated by a node connected to the electrical router and received by a node in another cluster except a cluster in which the electrical router is located.

For example, an $i^{th}$ cluster includes three electrical routers: an electrical router A, an electrical router B, and an electrical router C. An optical transceiver in the $i^{th}$ cluster separately allocates a time stamp to the electrical router A, the electrical router B, and the electrical router C. The optical transceiver converts an electrical signal received from the electrical router A into an optical signal only in a time stamp allocated to the electrical router A, that is, the electrical router A can use the optical transceiver only in the time stamp allocated to the electrical router A. The optical transceiver converts an electrical signal received from the electrical router B into an optical signal only in a time stamp allocated to the electrical router B, that is, the electrical router B can use the optical transceiver only in the time stamp allocated to the electrical router B. The optical transceiver converts an electrical signal received from the electrical router C into an optical signal only in a time stamp allocated to the electrical router C, that is, the electrical router C can use the optical transceiver only in the time stamp allocated to the electrical router C.

The optical receiver 32 is configured to receive an optical signal from the optical router, where a wavelength of the optical signal is corresponding to the cluster in which the optical transceiver that includes the optical receiver 32 is located; convert the received optical signal into an electrical signal; and send the electrical signal to each electrical router connected to the optical transceiver, so that an electrical router connected to a destination node that needs to receive the electrical signal sends the electrical signal to the destination node, and another electrical router connected to the optical transceiver discards the electrical signal.

No interference occurs between optical signals transmitted on different links, and therefore, if all x adaptively interconnected optical transceivers in each cluster are always allocated to a link with the heaviest communication traffic in the cluster, there are at least n optical signals that are corresponding to each cluster and of different wavelengths, so as to be distinguished from signals of different optical transceivers in other n-x clusters, where n-x optical signals of different wavelengths are used by fixedly interconnected optical transceivers in the other n-x clusters, and x optical signals of different wavelengths are used by the x adaptively interconnected optical transceivers in the cluster. An optical signal received by an optical receiver from the optical router is a signal sent in a cluster, except a cluster in which an optical transceiver that includes the optical receiver is located, in two clusters connected by the optical transceiver that includes the optical receiver.

Optionally, as shown in FIG. 3, an optical transceiver 31 is a fixedly interconnected optical transceiver, and an optical transmitter in the optical transceiver includes a laser 311 with a fixed frequency and a first modulator 312.

The laser 311 with a fixed frequency is configured to generate light of a preset wavelength for optical signal routing between two clusters connected by the optical transceiver, where lasers with a fixed frequency in different fixedly interconnected optical transceivers generate light of different wavelengths.

For example, a wavelength of light generated by a laser with a fixed frequency in a fixedly interconnected optical transceiver that connects the $i^{th}$ cluster and a $j^{th}$ cluster and that is in the $i^{th}$ cluster is different from a wavelength of light generated by a laser with a fixed frequency in a fixedly interconnected optical transceiver that connects the $i^{th}$ cluster and a $k^{th}$ cluster and that is in the $i^{th}$ cluster, where i, j, and k are not equal.

The first modulator 312 is configured to, in a time stamp allocated to an electrical router connected to the optical transceiver, modulate information carried in an electrical signal received from the electrical router onto the light generated by the laser 311 with a fixed frequency, and send light onto which the information is modulated to the optical router 21.

Therefore, when an optical transceiver is a fixedly interconnected optical transceiver, communication traffic of a fixed link established by the optical transceiver is an information amount of information modulated by a first modulator in an optical transmitter in the optical transceiver.

Optionally, as shown in FIG. 3, an optical transceiver is a fixedly interconnected optical transceiver, and an optical transmitter in the optical transceiver further includes a local counter 313, where the local counter 313 is connected to the first modulator 312 in the cluster.

The local counter 313 is configured to collect statistics about communication traffic that is in preset duration and of a fixed link established by a fixedly interconnected optical transceiver in which the first modulator 312 connected to the local counter 313 is located. For example, the communication traffic that is in the preset duration and of the fixed link established by the fixedly interconnected optical transceiver in which the first modulator 312 is located may be determined by collecting statistics about an information amount of information in an electrical signal and that is modulated onto light in the preset duration by the first modulator 312.

A main controller 223 in the cluster in which the optical transceiver is located is configured to determine k fixed links with the heaviest communication traffic in the preset duration according to communication traffic, collected by n-x local counters 313 in the cluster, that is in the preset duration and of fixed links established by fixedly interconnected optical transceivers in the cluster; allocate x adaptively interconnected transceivers in the cluster to the k fixed links with the heaviest communication traffic according to a set rule; and control the adaptively interconnected optical transceiver to establish, using the optical router, a link, except the fixed link, between two clusters connected by the fixed link.

For example, four adaptively interconnected optical transceivers in the $i^{th}$ cluster are allocated to k=3 fixed links with the heaviest communication traffic in the $i^{th}$ cluster, where two adaptively interconnected optical transceivers in the $i^{th}$ cluster are allocated to a fixed link with the heaviest communication traffic in the $i^{th}$ cluster. Assuming that the fixed link is a fixed link established between the $i^{th}$ cluster and the $j^{th}$ cluster by a fixedly interconnected optical transceiver in the $i^{th}$ cluster, the two adaptively interconnected optical transceivers establish, between the $i^{th}$ cluster and the $j^{th}$ cluster, two links except the fixed link established between the $i^{th}$ cluster and the $j^{th}$ cluster by the fixedly interconnected optical transceiver in the $i^{th}$ cluster. In addition, no interference occurs between an optical signal transmitted on the fixed link established between the $i^{th}$ cluster and the $j^{th}$ cluster by the fixedly interconnected optical transceiver in the $i^{th}$ cluster, and optical signals transmitted on the two links established between the $i^{th}$ cluster and the $j^{th}$ cluster by the two adaptively interconnected optical transceivers. For example, a wavelength of the optical signal transmitted on the fixed link established between the $i^{th}$ cluster and the $j^{th}$ cluster by the fixedly interconnected optical transceiver in the $i^{th}$ cluster may be made different from wavelengths of the optical signals transmitted on the two links established between the $i^{th}$ cluster and the $j^{th}$ cluster by the two adaptively interconnected optical transceivers, so that no interference occurs between the optical signal transmitted on the fixed link and the signals transmitted on the links established by the two adaptively interconnected optical transceivers. In addition, no interference occurs between the optical signals transmitted on the two links established between the $i^{th}$ cluster and the $j^{th}$ cluster by the two adaptively interconnected optical transceivers. Similarly, the wavelengths of the optical signals transmitted on the two links established between the $i^{th}$ cluster and the $j^{th}$ cluster by the two adaptively interconnected optical transceivers may be made different from each other, so that no interference occurs between the signals transmitted on the link established by the two adaptively interconnected optical transceivers.

Optionally, as shown in FIG. 3, an optical transceiver is an adaptively interconnected optical transceiver, and the optical transmitter 31 in the optical transceiver includes a tunable laser 314 and a second modulator 315.

The tunable laser 314 is configured to generate light of which a wavelength is determined by a main controller 223 according to the optical transceiver and two clusters connected by the optical transceiver, where the light is used for optical signal routing between the two clusters connected by the optical transceiver, and the main controller is in the cluster in which the optical transceiver is located.

That a main controller 223 in a cluster in which an adaptively interconnected optical transceiver is located determines a wavelength according to the optical transceiver and two clusters connected by the optical transceiver means. For a different adaptively interconnected optical transceiver, a wavelength that is of light generated by a tunable laser in the adaptively interconnected optical transceiver and determined by the main controller 223 is different; when an adaptively interconnected optical transceiver is allocated to a different fixed link, a wavelength that is of light generated by a tunable laser in the adaptively interconnected optical transceiver and determined by the main controller 223 is different. This also means that when an adaptively interconnected optical transceiver connects two different clusters, wavelengths of light generated by a tunable laser in the adaptively interconnected optical transceiver are different, and when different adaptively interconnected optical transceivers connect two same clusters, wavelengths of light generated by tunable lasers in the different adaptively interconnected optical transceivers are different from each other.

In addition, no interference occurs between optical signals transmitted on different links. Therefore, when two clusters connected by an adaptively interconnected optical transceiver are the same as two clusters connected by a fixedly interconnected optical transceiver, a wavelength of light generated by a tunable laser in the adaptively interconnected optical transceiver is different from a wavelength of light generated by a laser with a fixed frequency in the fixedly interconnected optical transceiver.

For example, four adaptively interconnected optical transceivers in the $i^{th}$ cluster are allocated to k=3 fixed links with the heaviest communication traffic in the $i^{th}$ cluster, where two adaptively interconnected optical transceivers in the $i^{th}$ cluster are allocated to a fixed link with the heaviest communication traffic in the $i^{th}$ cluster. Assuming that the fixed link is a fixed link established between the $i^{th}$ cluster and the $j^{th}$ cluster by a fixedly interconnected optical transceiver in the $i^{th}$ cluster, the two adaptively interconnected optical transceivers establish, between the $i^{th}$ cluster and the $j^{th}$ cluster, two links except the fixed link established between the $i^{th}$ cluster and the $j^{th}$ cluster by the fixedly interconnected optical transceiver in the $i^{th}$ cluster. In this case, if a wavelength that is determined by the main controller in the $i^{th}$ cluster for light of a tunable laser in one adaptively interconnected optical transceiver of the two adaptively interconnected optical transceivers is a first wavelength, a wavelength that is determined by the main controller in the $i^{th}$ cluster for light of a tunable laser in the other adaptively interconnected optical transceiver of the two adaptively interconnected optical transceivers is a second wavelength, and a wavelength of light generated by a laser with a fixed frequency in the fixedly interconnected optical transceiver that is in the $i^{th}$ cluster and establishes the fixed link between the $i^{th}$ cluster and the $j^{th}$ cluster is a third wavelength, the first wavelength, the second wavelength, and the third wavelength are not equal, and all the first wavelength, the second wavelength, and the third wavelength are wavelengths corresponding to the $j^{th}$ cluster. Alternatively, if the fixed link with the heaviest communication traffic in the $i^{th}$ cluster is a fixed link established between the $i^{th}$ cluster and a $k^{th}$ cluster by the fixedly interconnected optical transceiver in the $i^{th}$ cluster, the two adaptively interconnected optical transceivers establish, between the $i^{th}$ cluster and the $k^{th}$ cluster, two links except the fixed link established between the $i^{th}$ cluster and the $k^{th}$ cluster by the fixedly interconnected optical transceiver in the $i^{th}$ cluster. In this case, if a wavelength that is determined by the main controller in the $i^{th}$ cluster for light of a tunable laser in one adaptively interconnected optical transceiver of the two adaptively interconnected optical transceivers is a fourth wavelength, a wavelength that is determined by the main controller in the $i^{th}$ cluster for light of a tunable laser in the other adaptively interconnected optical transceiver of the two adaptively interconnected optical transceivers is a fifth wavelength, and a wavelength of light generated by a laser with a fixed frequency in the fixedly interconnected optical transceiver that is in the $i^{th}$ cluster and establishes the fixed link between the $i^{th}$ cluster and the $k^{th}$ cluster is a sixth wavelength, the fourth wavelength, the fifth wavelength, and the sixth wavelength are not equal. In addition, the first wavelength is not equal to the fourth wavelength, the fifth wavelength, or the sixth wavelength; the second wavelength is also not equal to the fourth wavelength, the fifth wavelength, or the sixth wavelength; the third wavelength is also not equal to the fourth wavelength, the fifth wavelength, or the sixth wavelength; all the fourth wavelength, the fifth wavelength, and the sixth wavelength are wavelengths corresponding to the $k^{th}$ cluster.

The second modulator 315 is configured to, in a time stamp allocated to an electrical router 222 connected to the optical transceiver, modulate information carried in an electrical signal received from the electrical router onto the light generated by the tunable laser 314, and send light onto which the information is modulated to the optical router 21.

Optionally, as shown in FIG. 3, an optical receiver in an optical transceiver includes a detector 321, where the detector 321 is configured to receive an optical signal from the optical router 21, convert the received optical signal into an electrical signal, and send the electrical signal to electrical routers 222 connected to the detector, where the electrical routers connected to the detector are electrical routers in a cluster in which the optical transceiver that includes the detector is located.

Optionally, as shown in FIG. 3, the optical router 21 includes a wavelength division multiplexer 211, a wavelength division demultiplexer 212, and an optical switch 213, where the wavelength division multiplexer 211 is configured to combine optical signals that are of different wavelengths and sent by optical transceivers in the ONoC into one beam and send the beam to the optical switch 213; the wavelength division demultiplexer 212 is configured to decompose, according to wavelengths, optical signals that are of different wavelengths and received from the optical switch 213, and for a cluster in the network-on-chip, send an optical signal of a wavelength corresponding to the cluster to optical transceivers in the cluster; and the optical switch is configured to complete wavelength-based optical signal routing, and route optical signals between two different clusters using at least x+1 different wavelengths.

In the ONoC provided in this embodiment of the present disclosure, when a node in a cluster performs communication, the node generates electrical information and sends the electrical information to an electrical router connected to the node, where the electrical router routes the electrical information to a destination node using a routing algorithm selected according to a network topology in the cluster. When a node between clusters performs communication, the node generates electrical information and sends the electrical information to an electrical router connected to the node; when a time stamp allocated to the electrical router by an optical transceiver connected to a cluster that includes a destination node arrives, the optical transceiver connected to the cluster that includes the destination node converts the electrical information into optical information of a specific wavelength, and routes, using a wavelength-based optical router, the optical information to the cluster that includes the destination node. An optical transceiver in the cluster that includes the destination node receives the optical information, converts the optical information into electrical information, and transmits the electrical information to all electrical routers in the cluster that includes the destination node. An electrical router connected to the destination node receives the electrical information, and other electrical routers discard the electrical information.

In the ONoC provided in this embodiment of the present disclosure, when optical link bandwidth is being adjusted, there are extremely few devices that need to be adjusted (only a wavelength of light generated by a tunable laser needs to be adjusted). Therefore, during bandwidth adjustment, a latency is relatively short.

Based on a same inventive concept, the embodiments of the present disclosure further provide a method and an apparatus for dynamically adjusting optical link bandwidth.

Because problem-solving principles of the method and the apparatus are similar to those of the foregoing ONoC, reference may be made to implementation of the foregoing method for implementation of the method and the apparatus, and no repeated description is provided.

Figure 4:
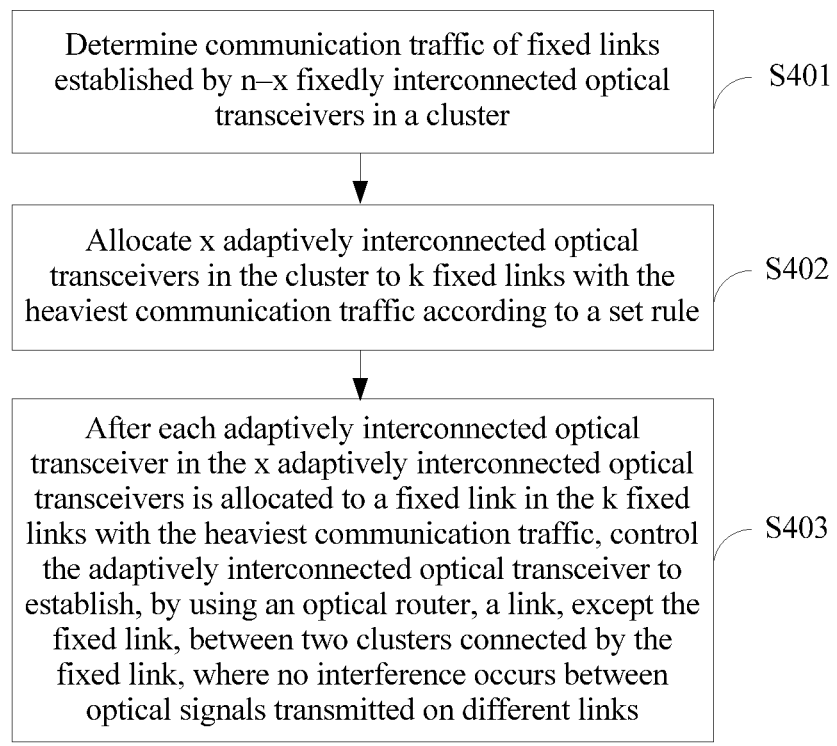
FIG. 4 is a first flowchart of a method for dynamically adjusting optical link bandwidth according to an embodiment of the present disclosure.

As shown in FIG. 4, a method for dynamically adjusting optical link bandwidth provided in an embodiment of the present disclosure includes the following steps.

Step S401. Determine communication traffic of fixed links established by n-x fixedly interconnected optical transceivers in a cluster, where each fixedly interconnected optical transceiver in the cluster establishes, using an optical router, a fixed link between the cluster and one cluster in other n-x clusters except the cluster, to exchange an optical signal, and a different fixedly interconnected optical transceiver in the cluster is configured to establish a fixed link between the cluster and a different cluster in the other n-x clusters.

Step S402. Allocate x adaptively interconnected optical transceivers in the cluster to k fixed links with the heaviest communication traffic according to a set rule.

Step S403. Control the adaptively interconnected optical transceiver to establish a link except the fixed link, using the optical router, between two clusters connected by the fixed link after each adaptively interconnected optical transceiver in the x adaptively interconnected optical transceivers is allocated to a fixed link in the k fixed links with the heaviest communication traffic, where k is a positive integer, k is less than n-x, and communication traffic of a fixed link is an information amount received by a fixedly interconnected optical transceiver that establishes the fixed link and carried by an electrical signal from an electrical router in a cluster in which the fixedly interconnected optical transceiver is located.

Figure 5:
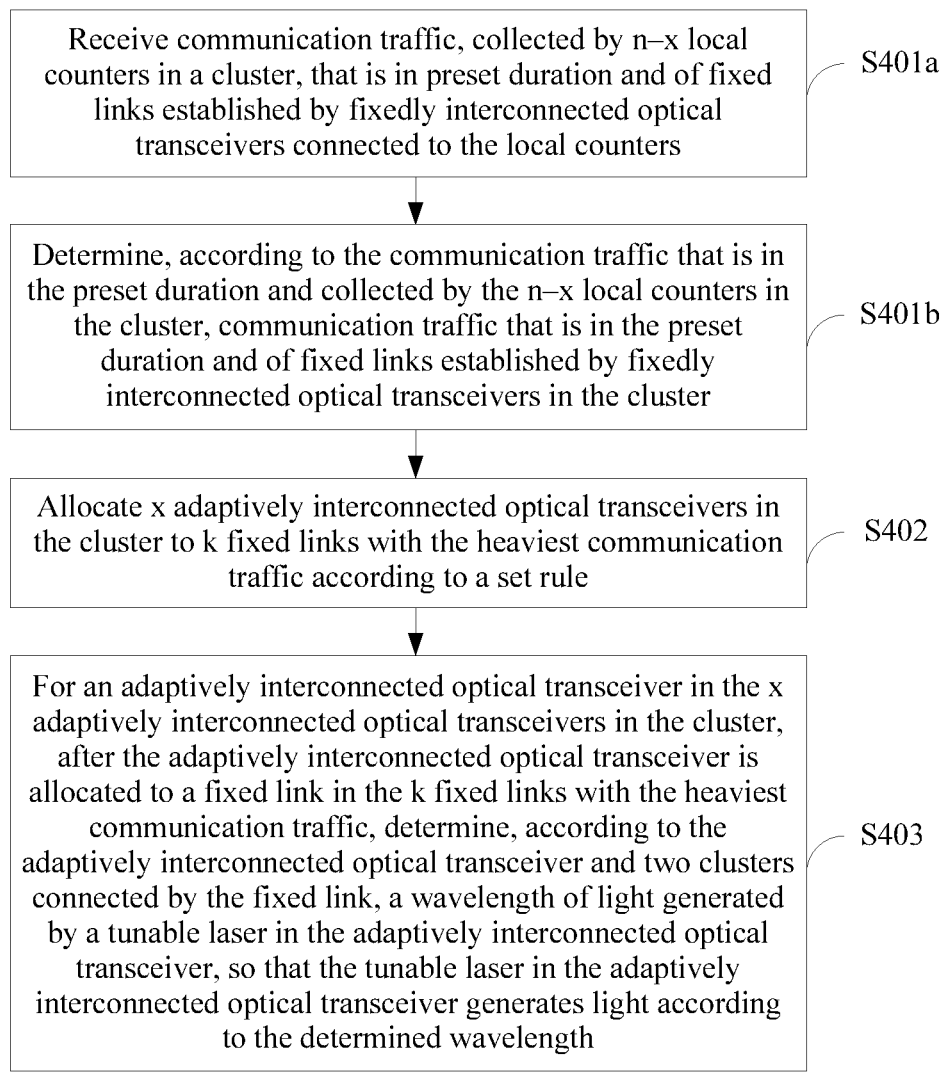
FIG. 5 is a second flowchart of a method for dynamically adjusting optical link bandwidth according to an embodiment of the present disclosure.

Optionally, as shown in FIG. 5, Step S401 includes the following steps.

Step S401a. Receive communication traffic, collected by n-x local counters in a cluster, that is in preset duration and of fixed links established by fixedly interconnected optical transceivers connected to the local counters.

Step S401b. Determine, according to the communication traffic that is in the preset duration and collected by the n-x local counters in the cluster, communication traffic that is in the preset duration and of fixed links established by fixedly interconnected optical transceivers in the cluster.

Optionally, as shown in FIG. 5, Step S403 includes for an adaptively interconnected optical transceiver in the x adaptively interconnected optical transceivers in the cluster, after the adaptively interconnected optical transceiver is allocated to a fixed link in the k fixed links with the heaviest communication traffic, determining, according to the adaptively interconnected optical transceiver and two clusters connected by the fixed link, a wavelength of light generated by a tunable laser in the adaptively interconnected optical transceiver, so that the tunable laser in the adaptively interconnected optical transceiver generates light according to the determined wavelength, where when an adaptively interconnected optical transceiver connects two different clusters, wavelengths of light generated by a tunable laser in the adaptively interconnected optical transceiver are different; when different adaptively interconnected optical transceivers connect two same clusters, wavelengths of light generated by tunable lasers in the different adaptively interconnected optical transceivers are different from each other; when two clusters connected by an adaptively interconnected optical transceiver are the same as two clusters connected by a fixedly interconnected optical transceiver, a wavelength of light generated by a tunable laser in the adaptively interconnected optical transceiver is different from a wavelength of light generated by a laser with a fixed frequency in the fixedly interconnected optical transceiver.

Figure 6:
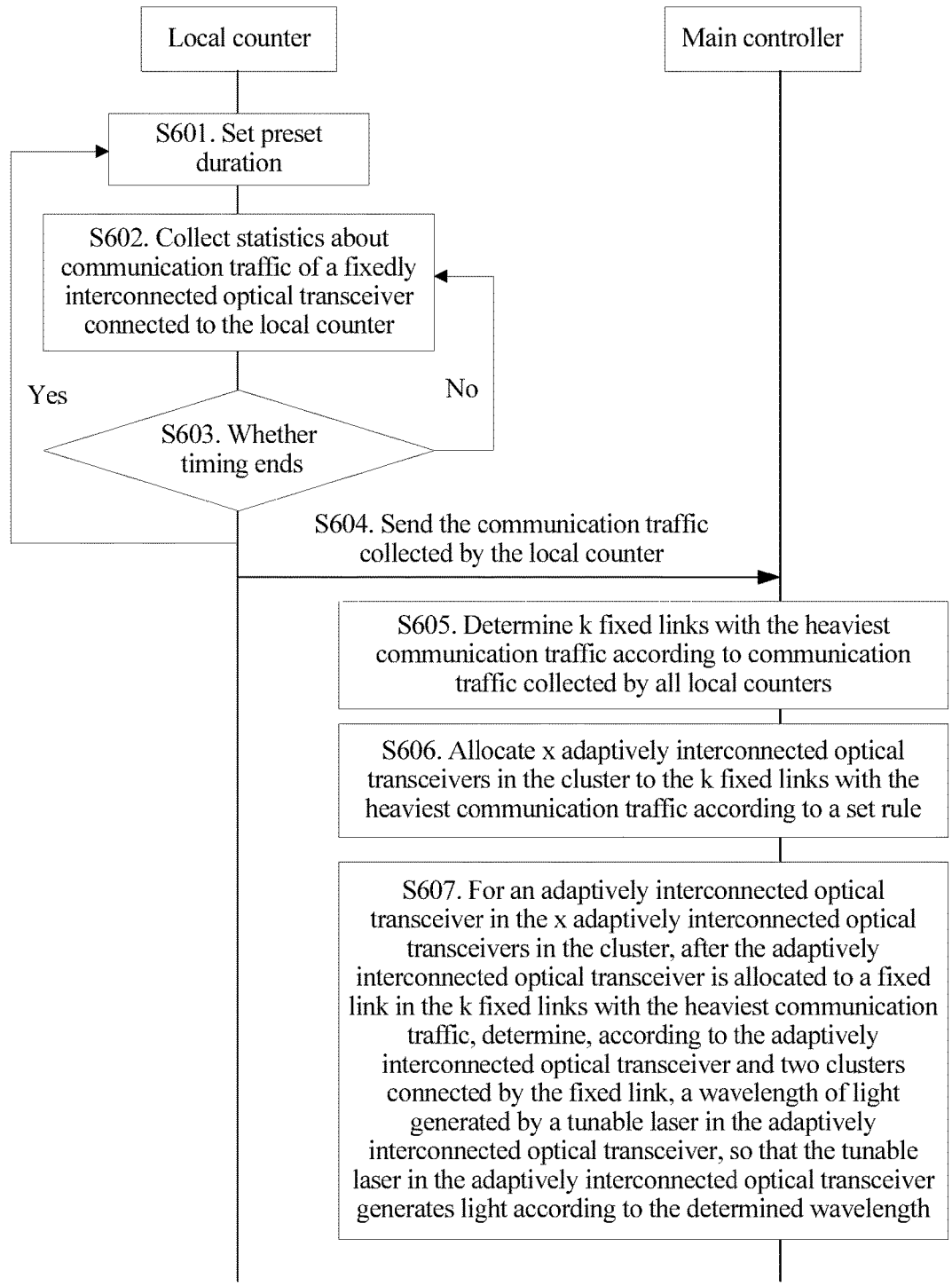
FIG. 6 is a flowchart of a method, in practical application, for dynamically adjusting optical link bandwidth according to an embodiment of the present disclosure.

In practical application, a main controller in a cluster adjusts optical link bandwidth using a flowchart shown in FIG. 6 having the following steps.

Step S601. A local counter sets preset duration, which may be implemented using a method of configuring a time register.

Step S602. The local counter collects statistics about communication traffic of a fixedly interconnected optical transceiver connected to the local counter.

Step S603. The local counter determines whether timing ends, and if the timing ends, performs S601 and performs S604; if the timing does not end, performs S602.

Step S604. The local counter sends the communication traffic collected by the local counter to the main controller.

Step S605. The main controller determines k fixed links with the heaviest communication traffic according to communication traffic collected by all local counters.

Step S606. The main controller allocates x adaptively interconnected optical transceivers in the cluster to the k fixed links with the heaviest communication traffic according to a set rule.

Step S607. For an adaptively interconnected optical transceiver in the x adaptively interconnected optical transceivers in the cluster, after the adaptively interconnected optical transceiver is allocated to a fixed link in the k fixed links with the heaviest communication traffic, determine, according to the adaptively interconnected optical transceiver and two clusters connected by the fixed link, a wavelength of light generated by a tunable laser in the adaptively interconnected optical transceiver, so that the tunable laser in the adaptively interconnected optical transceiver generates light according to the determined wavelength.

In a process of performing S604-S607, S601-S603 continue to be performed.

Figure 7:
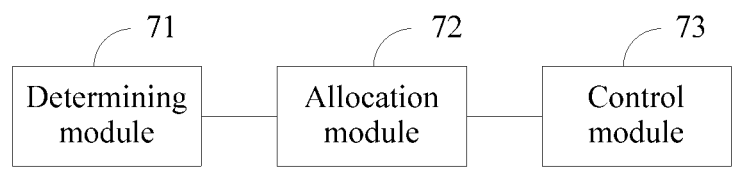
FIG. 7 is a schematic structural diagram of an apparatus for dynamically adjusting optical link bandwidth according to an embodiment of the present disclosure.

As shown in FIG. 7, an apparatus for dynamically adjusting optical link bandwidth provided in an embodiment of the present disclosure includes a determining module 71 configured to determine communication traffic of fixed links established by n-x fixedly interconnected optical transceivers in a cluster, where each fixedly interconnected optical transceiver in the cluster establishes, using an optical router, a fixed link between the cluster and one cluster in other n-x clusters except the cluster, to exchange an optical signal, and a different fixedly interconnected optical transceiver in the cluster is configured to establish a fixed link between the cluster and a different cluster in the other n-x clusters; an allocation module 72 configured to allocate x adaptively interconnected optical transceivers in the cluster to k fixed links with the heaviest communication traffic according to a set rule; and a control module 73 configured to control, after each adaptively interconnected optical transceiver in the x adaptively interconnected optical transceivers is allocated to a fixed link in the k fixed links with the heaviest communication traffic, the adaptively interconnected optical transceiver to establish, using the optical router, a link, except the fixed link, between two clusters connected by the fixed link, where no interference occurs between optical signals transmitted on different links, k is a positive integer, k is less than n-x, and communication traffic of a fixed link is an information amount received by a fixedly interconnected optical transceiver that establishes the fixed link and carried by an electrical signal from an electrical router in a cluster in which the fixedly interconnected optical transceiver is located.

Optionally, the determining module 71 is configured to receive communication traffic, collected by local counters in n-x local counters in a cluster, that is in preset duration and of fixed links established by fixedly interconnected optical transceivers connected to the local counters; and determine, according to the communication traffic that is in the preset duration and collected by the n-x local counters in the cluster, communication traffic that is in the preset duration and of fixed links established by fixedly interconnected optical transceivers in the cluster.

Optionally, the control module 73 is configured to, for an adaptively interconnected optical transceiver in the x adaptively interconnected optical transceivers, after the adaptively interconnected optical transceiver is allocated to a fixed link in the k fixed links with the heaviest communication traffic, determine, according to the adaptively interconnected optical transceiver and two clusters connected by the fixed link, a wavelength of light generated by a tunable laser in the adaptively interconnected optical transceiver, so that the tunable laser in the adaptively interconnected optical transceiver generates light according to the determined wavelength, where when an adaptively interconnected optical transceiver connects two different clusters, wavelengths of light generated by a tunable laser in the adaptively interconnected optical transceiver are different; when different adaptively interconnected optical transceivers connect two same clusters, wavelengths of light generated by tunable lasers in the different adaptively interconnected optical transceivers are different from each other; when two clusters connected by an adaptively interconnected optical transceiver are the same as two clusters connected by a fixedly interconnected optical transceiver, a wavelength of light generated by a tunable laser in the adaptively interconnected optical transceiver is different from a wavelength of light generated by a laser with a fixed frequency in the fixedly interconnected optical transceiver.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read only memory (CD-ROM), an optical memory, and the like) that include computer-usable program code.

The present disclosure is described with reference to the flowcharts and/or block diagrams of the method, the device, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. An optical network-on-chip (ONoC), comprising:
   an optical router configured to route optical signals between different clusters;
   n-x+1 clusters, wherein a cluster comprises:
   a plurality of nodes;
   a plurality of electrical routers, wherein each electrical router is connected to a node in the plurality of nodes; and
   n optical transceivers, wherein the n optical transceivers comprise n-x fixedly interconnected optical transceivers and x adaptively interconnected optical transceivers, wherein each fixedly interconnected optical transceiver is configured to establish, using the optical router, a link to exchange an optical signal between the cluster in which the optical signal generated and one cluster in other n-x clusters, and wherein a different fixedly interconnected optical transceiver is configured to establish a link between the cluster and a different cluster in the other n-x clusters;
   a main controller configured to:
   allocate x adaptively interconnected optical transceivers to k fixed links with heaviest communication traffic according to a set rule and communication traffic of fixed links established by the n-x fixedly interconnected optical transceivers in the cluster; and
   control an adaptively interconnected optical transceiver to establish another link between two clusters connected by a fixed link for the adaptively interconnected optical transceiver in the x adaptively interconnected optical transceivers, wherein no interference occurs between optical signals transmitted on different links, wherein k is a positive integer, wherein k is less than x, and wherein communication traffic of a fixed link is an information amount received by a fixedly interconnected optical transceiver that establishes the fixed link and carried by an electrical signal from an electrical router in the cluster in which the fixedly interconnected optical transceiver is located.

2. The optical network-on-chip according to claim 1, wherein the plurality of electrical routers in the cluster are connected using a network topology selected according to a network size of the cluster, and wherein each electrical router in the cluster is configured to:
determine that a destination node of the received electrical signal is in the cluster in which the electrical router is located after receiving an electrical signal generated by a node connected to the electrical router; and
route the received electrical signal to the destination node according to a routing algorithm used in the cluster in which the electrical router is located.

3. The optical network-on-chip according to claim 1, wherein an optical transceiver of the n optical transceivers comprises an optical transmitter and an optical receiver, wherein the optical transmitter is configured to:
allocate a time stamp to an electrical router connected to the optical transceiver;
convert an electrical signal received from the electrical router into an optical signal before time indicated by the time stamp that is allocated to the electrical router; and
send the optical signal to the optical router, wherein the electrical signal received from the electrical router is an electrical signal that is generated by a node connected to the electrical router and that is received by a node in another cluster except the cluster in which the electrical router is located, and
wherein the optical receiver is configured to:
receive an optical signal from the optical router, wherein a wavelength of the optical signal is corresponding to a cluster in which the optical transceiver is located;
convert the received optical signal into an electrical signal; and
send the electrical signal to each electrical router connected to the optical transceiver, such that an electrical router connected to a destination node that needs to receive the electrical signal sends the electrical signal to the destination node, wherein other electrical routers connected to the optical transceiver discards the electrical signal.

4. The optical network-on-chip according to claim 1, wherein the optical router comprises:
a wavelength division multiplexer;
a wavelength division demultiplexer; and
an optical switch,
wherein the wavelength division multiplexer is configured to combine optical signals that are of different wavelengths and sent by optical transceivers in the ONoC into one beam and send the beam to the optical switch,
wherein the wavelength division demultiplexer is configured to:
decompose, according to wavelengths, optical signals that are of different wavelengths and received from the optical switch; and
send, for a cluster in the ONoC, an optical signal of a wavelength corresponding to the cluster to optical transceivers in the cluster, and
wherein the optical switch is configured to:
complete wavelength-based optical signal routing; and
route optical signals between two different clusters using at least x+1 different wavelengths.

5. The optical network-on-chip according to claim 3, wherein the optical transceiver is a fixedly interconnected optical transceiver, and wherein the optical transmitter in the optical transceiver comprises a laser with a fixed frequency and a first modulator, wherein the laser with a fixed frequency is configured to generate light of a preset wavelength for optical signal routing between two clusters connected by the optical transceiver, wherein lasers with a fixed frequency in different fixedly interconnected optical transceivers generate light of different wavelengths;
and wherein the first modulator is configured to:
modulate information carried in an electrical signal received from the electrical router onto the light generated by the laser with a fixed frequency in a time stamp allocated to an electrical router connected to the optical transceiver; and
send light onto which the information is modulated to the optical router.

6. The optical network-on-chip according to claim 3, wherein the optical transceiver is an adaptively interconnected optical transceiver, wherein the optical transmitter in the optical transceiver comprises a tunable laser and a second modulator, wherein the tunable laser is configured to generate light of which a wavelength is determined by a main controller according to the optical transceiver and two clusters connected by the optical transceiver, wherein the light is used for optical signal routing between the two clusters connected by the optical transceiver, and the main controller is in the cluster in which the optical transceiver is located, and wherein the second modulator is configured to:
modulate information carried in an electrical signal received from the electrical router onto the light generated by the tunable laser in a time stamp allocated to an electrical router connected to the optical transceiver; and
send light onto which the information is modulated to the optical router.

7. The optical network-on-chip according to claim 3, wherein the optical receiver in the optical transceiver comprises a detector, wherein the detector is configured to:
receive an optical signal from the optical router;
convert the received optical signal into an electrical signal; and
send the electrical signal to electrical routers connected to the detector, and wherein the electrical routers connected to the detector are electrical routers in the cluster in which the optical transceiver that comprises the detector is located.

8. The optical network-on-chip according to claim 5, wherein the optical transceiver is a fixedly interconnected optical transceiver, wherein the optical transmitter in the optical transceiver further comprises a local counter, wherein the local counter is connected to the first modulator, wherein the local counter is configured to collect statistics about communication traffic that is in preset duration and of a link established by the fixedly interconnected optical transceiver in which the first modulator connected to the local counter is located, and wherein the main controller in the cluster in which the optical transceiver is located is configured to:

determine k fixed links with the heaviest communication traffic in the preset duration according to communication traffic, collected by n-x local counters in the cluster, that is in the preset duration and of fixed links established by fixedly interconnected optical transceivers in the cluster;

allocate x adaptively interconnected transceivers in the cluster to the k fixed links with the heaviest communication traffic according to a set rule; and control the adaptively interconnected optical transceiver to establish, using the optical router, a link between two clusters connected by a fixed link after each adaptively interconnected optical transceiver in the x adaptively interconnected optical transceivers is allocated to the fixed link in the k fixed links with the heaviest communication traffic.

9. A method for dynamically adjusting optical link bandwidth, comprising:

determining communication traffic of fixed links established by n-x fixedly interconnected optical transceivers in a cluster, wherein a fixed link between the cluster and one cluster in other n-x clusters except the cluster is established to exchange an optical signal;

allocating x adaptively interconnected optical transceivers in the cluster to k fixed links with the heaviest communication traffic according to a set rule; and controlling to establish another link between two clusters connected by the fixed link, wherein k is a positive integer, wherein k is less than n-x, and wherein the communication traffic of a fixed link is an information amount received by a fixedly interconnected optical transceiver that establishes the fixed link and carried by an electrical signal from an electrical router in a cluster in which the fixedly interconnected optical transceiver is located.

10. The method according to claim 9, wherein determining the communication traffic of the fixed links comprises:

receiving communication traffic, collected by local counters in n-x local counters in a cluster, that is in preset duration and of fixed links established by fixedly interconnected optical transceivers connected to the local counters; and determining, according to the communication traffic that is in the preset duration and collected by the n-x local counters in the cluster, communication traffic that is in the preset duration and of fixed links established by fixedly interconnected optical transceivers in the cluster.

11. The method according to claim 9, wherein controlling to establish the another link between the two clusters connected by the fixed link comprises:

determining a wavelength of light generated by a tunable laser in the adaptively interconnected optical transceiver for an adaptively interconnected optical transceiver in the x adaptively interconnected optical transceivers after the adaptively interconnected optical transceiver is allocated to a fixed link in the k fixed links with the heaviest communication traffic, such that the tunable laser in the adaptively interconnected optical transceiver generates light according to the determined wavelength.

* * * * *